Patented Feb. 4, 1930

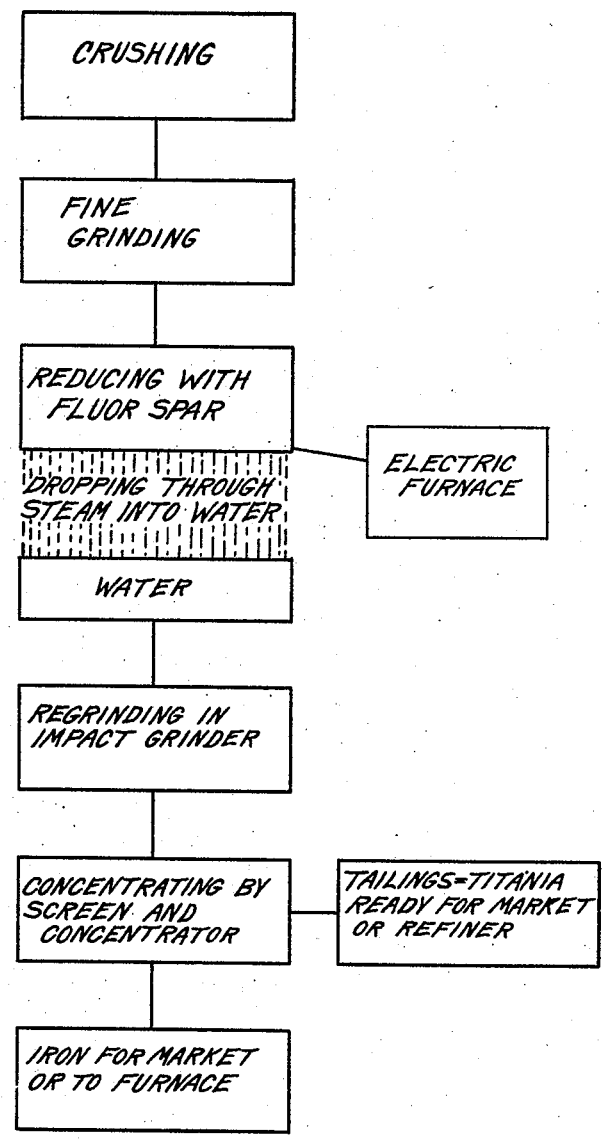

1,745,732

UNITED STATES PATENT OFFICE

GEORGE J. BANCROFT, OF DENVER, COLORADO

METHOD OF TREATING FERROTITANIUM ORES

Application filed February 19, 1929. Serial No. 341,205.

This invention relates to improvements in methods of treating titaniferous iron ores.

In many parts of this country there are large deposits of iron ores which are combined with titanium and which usually consist of a mixture of magnetite ($Fe_3O_4$) or/and hematite ($Fe_2O_3$) with titanium-iron compounds of variable composition and of earthy materials. Among the titanium-iron compounds are ilmenite ($FeTiO_3$), titanite ($CaTiSiO_5$) and a large number of other compounds whose titanium content varies from 5.6% to 69.5%. Among the earthy materials, quartz, lime, spinel, mica and olivine are the most common.

Iron and titanium oxide ($TiO_2$) are both valuable by themselves, but mixtures of the two are of little or no value because the titanium oxide is very refractory and nonreducible and makes nonfluid slags at the usual temperatures employed with iron smelters.

It is the object of this invention to produce a method whereby the iron and the titaniferous and other nonferrous materials of ferrotitaniferous ores may be separated in such a way that these ores may be treated in a commercial way and at a moderate cost.

The method by means of which I accomplished the results desired is as follows:

The ore is first crushed and then ground to suitable fineness for the purpose of unlocking the mineral aggregates from each other without breaking down the crystals as such.

To the crushed and ground ore is now added pulverized fluorspar (calcium fluorid) and the two thoroughly mixed.

The mixture of ground ore and fluorspar is now subjected to a reducing roast, preferably in an apparatus comprising a revolving, inclined cylinder having a lining of refractory material. Hot gases from a furnace together with some unburned gas such as carbon monoxide are introduced into the lower end of the rotary kiln and the pulverized ore and fluorspar mixed with coal dust or oil residuum is introduced into the upper end of the kiln. As the kiln revolves the ore mixture travels slowly towards the lower or discharge end. The temperature at which the reducing roast is carried out is such that the finish of the roast takes place at the temperature of incipient fusion of iron.

Titanium oxide $TiO_2$ is not reducible at ordinary roast temperatures on account of the exceptionally strong chemical affinity of titanium for oxygen. Iron oxides are easily reduced and iron compounded with titanium and oxygen can be torn or unlocked from the combination at attainable temperatures when the reducing roast is carried out in the presence of fluorspar which is therefore mixed with the ores as above described.

After the mixture of ferrotitaniferous ores and fluorspar has passed through the furnace where it has been subjected to a reducing roast, it is necessary to guard against reoxidation and therefore the white hot pulp as it leaves the kiln or furnace is passed through live steam and into water.

In passing through the furnace the particles of iron oxide are reduced to small iron sponges which the high temperature near the discharge end coalesces into small iron nuggets. The titanium-iron oxides are reduced more or less depending on the size of the particles and the percentage of titanium. Some particles become little honeycombs of iron, retaining part of the titanium oxide in the cells and other particles which have a high titanium content become reduced superficially only and large particles of this class are therefore reduced to a less extent than the smaller particles. The high temperature at the finish of the roast coalesces the reduced iron and exudes more or less of the enclosed titanium oxide, some of which is in such a fine state of subdivision that it passes off with the gas and is caught in the flue dust chambers, together with other fumes such as carbon black and calcium fluo-titanate. This titanium is now ready for the market as a dark paint pigment.

The pulverized fluorspar which is mixed with the ore before the latter is roasted tends to promote separation of the iron and titanium. The action of the fluorspar may be partly catalytic or it may be due to breaking up the titanium carbides, carbonitrides and nitrides.

Owing to the special affinity of titanium for nitrogen, nitride is formed to a greater or less extent in all reductions where nitrogen is available and microscopic examinations of the calcines where fluorspar is not used show many particles completely coated with metallic looking nitrides. When fluorspar is used less nitrides are found in the calcines and the iron concentrates contain less titanium.

The exact action that takes place when fluorspar is present in the ore during the roasting operation is not known, but it is believed that some calcium-fluo-titanate is formed and distils over into the flue chambers and that it also decomposes the nitrides, carbonitrides and carbides. The amount of fluorspar to be used varies with the nature of the ores to be treated; the location and the commercial conditions. In no case, however, should more fluorspar be used than is required to form calcium-fluo-titanate with all of the titanium present in the ore. The fluorine does not combine with the iron to any appreciable extent unless used in excess.

The water into which the incandescent pulp is dropped should be limited in quantity and should contain a small amount of caustic alkali. By using a small or limited supply of water, it will be maintained at the boiling point so that a large amount of steam will be generated. The discharge end of the rotary kiln must be connected with the water container or tank by means of a chamber of considerable height so that the incandescent materials will be exposed to the steam for an appreciable length of time before it strikes the water and it should also be spread as widely as possible before striking the water so as to prevent piling up and so as to obtain uniform cooling. By passing the incandescent pulp through steam and into water, the carbonitrides and nitrides are broken up and yield ammonia which is a valuable byproduct.

The material that has passed through the roaster and which has been cooled in the water consists of a mixture comprising small iron nuggets vesicular iron shells containing entangled titanium oxide, thin shells of iron surrounding unreduced centers of high grade titanium oxide and some fluorspar compounds. The iron is tough and malleable while the unreduced compounds such as titanium oxide and its unreduced compounds are brittle and friable.

The different physical properties just pointed out are taken advantage of for the purpose of effecting a separation of the iron from the titanium oxide and other nonferrous material, and for this purpose a crusher is employed.

The usual form of crusher comprises two pieces of hard material between which the ore particles are placed and crushed; machines of this type are not well suited for selective crushing however. In order to effect the desired separation, the iron particles and nuggets should remain as they are while the unreduced rock crystals should be pulverized and reduced to extreme fineness. The type of grinder that is best suited for the selective crushing that is necessary for the purpose here under consideration is known as an impact grinder in which the materials are thrown by the action of centrifugal force against a hard wall or other surface. The brittle particles are crushed by their own momentum when they strike the wall, but the malleable and tough iron particles are not broken up to the same extent, thereby obtaining a selective grinding. Aggregates formed in part of iron and in part of crystals are broken apart due to their greatly different degrees of hardness and brittleness and therefore the iron cells have a good chance of separating from the more brittle titanium compounds.

After the materials have been run through an impact grinder, they are then screened, whereby the coarse iron nuggets are separated from the smaller particles.

The parts that pass through the screen are concentrated by any ordinary wet concentration method as, for example, by a Wilfley table and the very fine materials are subjected to a flotation separation.

The concentrates will not be pure iron nor will the tailings be pure titanium oxide but the products are in commercial form. The screenings and concentrates are high grade iron, while the tailings and the titanium flue dust are high grade titanium products. The flue dust having been formed by sublimation is, of course, very fine and is particularly well suited for pigments.

The fumes from the furnace are caught in the roasting chambers as above explained.

When the incandescent materials pass from the furnace and into the steam, the nitrides are broken up and form ammonia which becomes a valuable byproduct.

The tailings from the concentrator are rich in titanium and are ready for the market or for the refiner while the iron may be marketed or sent to the furnace.

In the accompanying drawing the sequence and relationship of the several steps are shown.

It is well known that electric smelting of ores on account of its high temperature enables better and different results to be obtained than when the smelting is accomplished by means of heat obtained from the combustion of coal, but the expense attendant upon electric smelting makes this process, as a rule prohibitive. The greatest consumption of electric energy during the smelting takes place in raising the temperature of the ore to the point that can be reached by means of the ordinary methods. In the method which has herein been described, it is possible to transfer the ore directly from the rotary kiln to an electric furnace instead of passing it into the water in the manner above described. In this way the greater amount of heat is produced by the cheaper method and the electric furnace is used merely to raise the temperature of the ore from the point attained in the rotary kiln to the temperature desired to be obtained in the electric furnace and by this means the same results are obtained as if the entire amount of heat were obtained by electric means with only a small part of the cost which would be necessary if the temperature were raised by electric means entirely.

I have found that the fluorspar performs its function of producing an almost complete separation of the iron from the titanium when the ore is passed through an electric smelter as when the process above described is employed. By combining the two different methods of obtaining the necessary temperatures the desired results are obtained at a reasonable figure even when an electric smelter is employed for producing part of the heat as above described.

Having described the invention what is claimed as new is:

1. The step in the process of treating ferrotitanium ores which consists in subjecting the ore to a reducing roast in the presence of fluorspar.

2. The method of separating iron from the titanium in ferrotitanium ores which comprises grinding the ore, mixing the ground ore with ground fluorspar and subjecting the mixture to a reducing roast.

3. The method of treating ferrotitanium ores so as to separate the iron from the titanium and earthy matters which consists in crushing and then fine grinding the ore, mixing pulverized fluorspar with the ground ore, subjecting the mixture to a reducing roast and passing the roasted material through steam and into water.

4. The method of treating ferrotitanium ores so as to separate the iron from the titanium and earthy matters which consists in crushing and then fine grinding the ore, mixing pulverized fluorspar with the ground ore, subjecting the mixture to a reducing roast, passing the roasted material through steam and into water and regrinding the ore in an impact grinder whereby the more brittle particles will be further reduced while the iron particles are left unbroken.

5. The method of treating ferrotitanium ores so as to separate the iron from the titanium and earthy matters which consists in crushing the ore, grinding the crushed ore, mixing the ground ore with pulverized fluorspar and carbonaceous material, subjecting the mixture to a roast in a reducing atmosphere, passing the incandescent material from the roasting furnace through steam and into water, regrinding the roasted ores in an impact grinder whereby the brittle nonferrous particles are further reduced in size, subjecting the ground material to a screening process whereby the larger iron particles are separated, and subjecting the particles that pass through the screen to the action of a concentrator whereby the smaller iron particles are separated from the nonferrous materials.

6. The method of treating ferrotitanium ores so as to separate the iron from the titanium and earthy matters which consists in crushing the ore, grinding the crushed ore, mixing the ground ore with pulverized fluorspar and carbonaceous material, subjecting the mixture to a roast in a reducing atmosphere, passing the incandescent material from the roasting furnace through steam and into water containing a caustic alkali regrinding the roasted ore in an impact grinder whereby the brittle nonferrous particles are further reduced in size, subjecting the ground material to a screening action whereby the larger iron particles are separated from the smaller and then concentrating the screenings for the purpose of effecting a further separation of the ferrous from the nonferrous materials.

In testimony whereof I affix my signature.

GEORGE J. BANCROFT.